March 22, 1966  R. M. CANZONERI  3,241,375
TRANSDUCER
Filed April 3, 1961  3 Sheets-Sheet 1
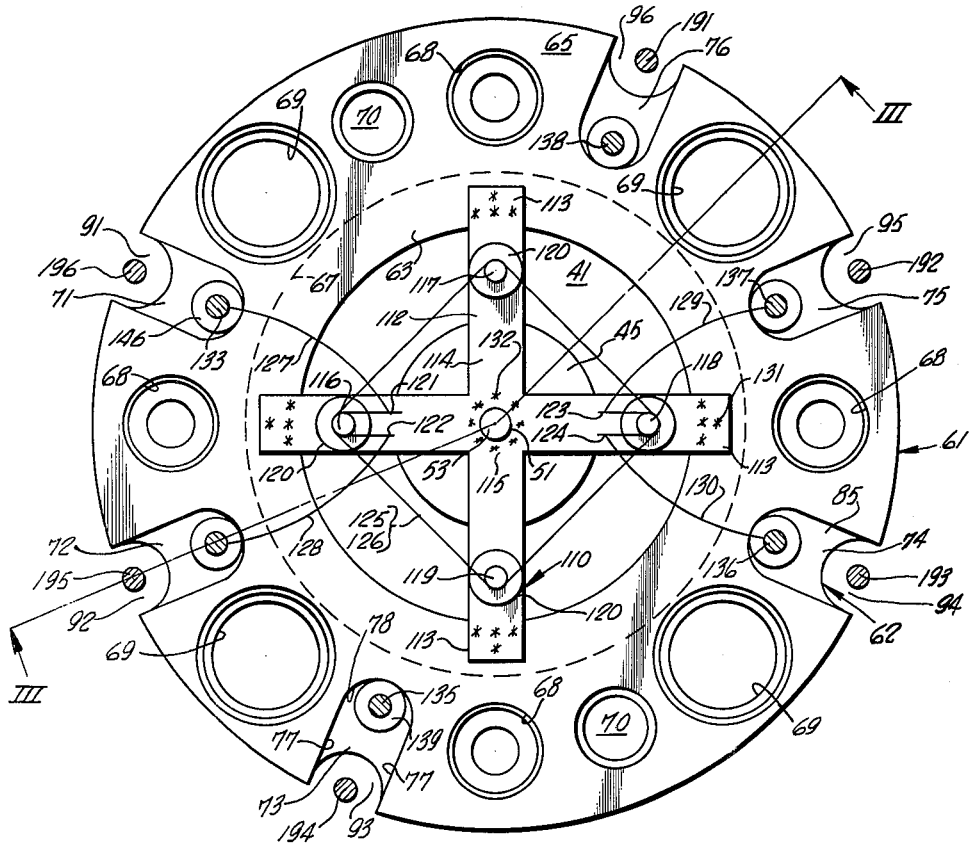
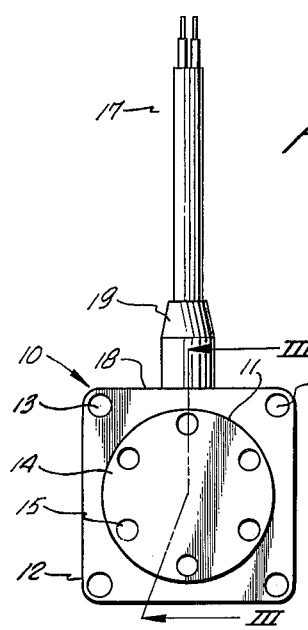
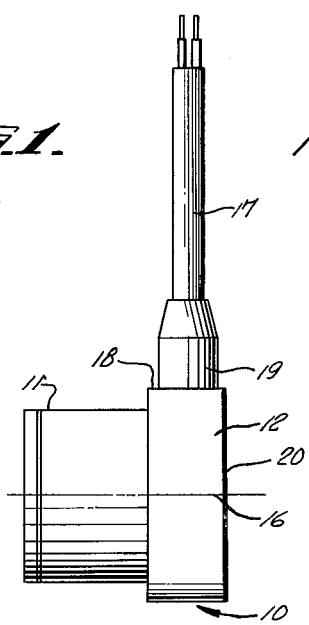
INVENTOR.
RICHARD M. CANZONERI
BY
Christie, Parker & Hale
ATTORNEYS.

INVENTOR.
RICHARD M. CANZONERI
BY Christie, Parker & Hale
ATTORNEYS.

March 22, 1966 R. M. CANZONERI 3,241,375
TRANSDUCER

Filed April 3, 1961 3 Sheets-Sheet 3

INVENTOR.
RICHARD M. CANZONERI
BY Christie Parker & Hale
ATTORNEYS.

United States Patent Office 3,241,375
Patented Mar. 22, 1966

3,241,375
TRANSDUCER
Richard M. Canzoneri, Arcadia, Calif., assignor to Consolidated Electrodynamics Corporation, Pasadena, Calif., a corporation of California
Filed Apr. 3, 1961, Ser. No. 100,319
5 Claims. (Cl. 73—517)

This invention relates to transducers. More particularly, it relates to accelerometers in which motion of a seismic mass is reflected in a change in the resistance of strain-gauge sensing elements mounted within the transducer.

A transducer is generally considered to be a device wherein one type of impulse or energy form is manifested and transformed into another form of energy as, for instance, in a loud-speaker where electrical energy is transferred into acoustical energy.

The transducer of this invention has application where motion is transformed into an electrical impulse and the electrical impulse is a representation of, or has correlation to, the displacement, velocity, or acceleration of a mass moving relative to its surroundings. The same result may be had if the base or surrounding environment of the seismic mass is fixed to a moving body and moves relative to the mass which has a tendency to remain motionless because of its own inertia. In either case, the amount and rate of relative motion is utilized to obtain an output from the transducer.

Accelerometers have recently enjoyed increased importance in technology, particularly in view of their use aboard aircraft, rockets, and rocket satellites. In such applications accelerometers are frequently used to obtain indicia of the vibration present either in components or in localized areas of the overall structure. It is possible to obtain the vibrational characteristic of an engine nacelle on a jet airplane by attaching an accelerometer to a support of the engine and observing the output of the accelerometer. If the basic nature of the vibration is known, knowledge of the frequency and the magnitude of the output permits the acceleration suffered at the location of the accelerometer to be determined as a check on the designed mechanical or structural properties. Applications such as that suggested invariably lead to the requirement that the accelerometer be light in weight and small in dimensions so as not to unduly interfere with the environment. This invention provides such an accelerometer.

It was mentioned previously that the accelerometer of this invention is of the strain-gauge type. Motion of the seismic mass of the accelerometer is reflected in a change in the peripheral dimensions of a loop or winding of sensitive wire. The wire has the property that as it is subjected to strain and elongation, its electrical resistance characteristics change. If a known voltage is impressed across input terminals of the accelerometer, the resulting change in the internal resistance of the accelerometer produces an output voltage or current which is a direct function of the amount of motion of the seismic mass relative to its surroundings.

Accelerometers known prior to the development of this invention suffered from many defects; however, many had their own strong points. While many accelerometers known heretofore are small and light-weight, they often reflect undesired input impulses or cannot tolerate high gravity (G) inputs. Other accelerometers are capable of accepting high gravity inputs but are not useful over varying acceleration ranges, while still others are capable of operation over different acceleration ranges and through various gravity inputs, but are restricted to very narrow temperature ranges. Various other devices can be used over an extended temperature range without suffering any appreciable change in output characteristics of the accelerometer, but these, too, suffer from weight-size considerations and have limitations on the acceleration range at which the device can be operated. Each single accelerometer unit is intended to sense motion along a particular axis and for reliable results it is necessary that cross-axis sensitivity, or the sensitivity of the device to inputs at a direction perpendicular to the sensitive axis of the accelerometer, be kept to a minimum. Many of the prior art devices had relatively high cross-axis sensitivity, that is, an input at a direction perpendicular to the primary sensitive axis of the accelerometer resulted in a significant output from the accelerometer. This invention provides an accelerometer combining the desirable characteristics of prior transducers while maintaining utility and accuracy over extended temperature and acceleration ranges.

Generally speaking, this invention encompasses a transducer comprising a seismic mass and a cage or shell surrounding or enclosing the seismic mass. A spring means or flexural element is secured across each of two open ends of the cage and is also secured to the mass enclosed by the cage. Electrical means responsive to deformation of the spring means are secured to the spring means. Preferably the electrical means are of the unbonded strain-gauge type, but bonded strain-gauge means may also be utilized.

A support is provided to enclose and carry the seismic mass cage or enclosure as auxiliary equipment to the basic componentry of the invention. A damping fluid is present within the cage to attenuate the motion of the mass relative to the cage and support so that the motion of the mass is a true indication of the monitored physical input and is not affected by the normal vibrational characteristics of the accelerometer or by the high frequency background vibration of the monitored body. Electrical connections for the motion-sensing elements at either end of the mass are provided within the support together with means to compensate for changes in the response pattern of the accelerometer over a predetermined temperature range. The support housing is sealed to provide for substantially linear operation of the accelerometer over an extended range. The tolerances between the fixed and moving portions of the accelerometer and the deviation of the sensitive axis of the accelerometer from the support base are kept to a minimum to assure that inputs to the accelerometer in a direction perpendicular to the primary or sensitive axis produce the smallest output possible (low cross-axis sensitivity).

The following detailed description of the accelerometer of this invention is taken in conjunction with the accompanying drawings, wherein:

FIGURE 1 is a top plan view of the accelerometer transducer of this invention;

FIGURE 2 is a side elevational view of the accelerometer;

FIGURE 4 is a further enlarged top plan view of the wiring assembly of the transducer taken along line IV—IV of FIGURE 3.

I. GENERAL CONFIGURATION

Figure 3:
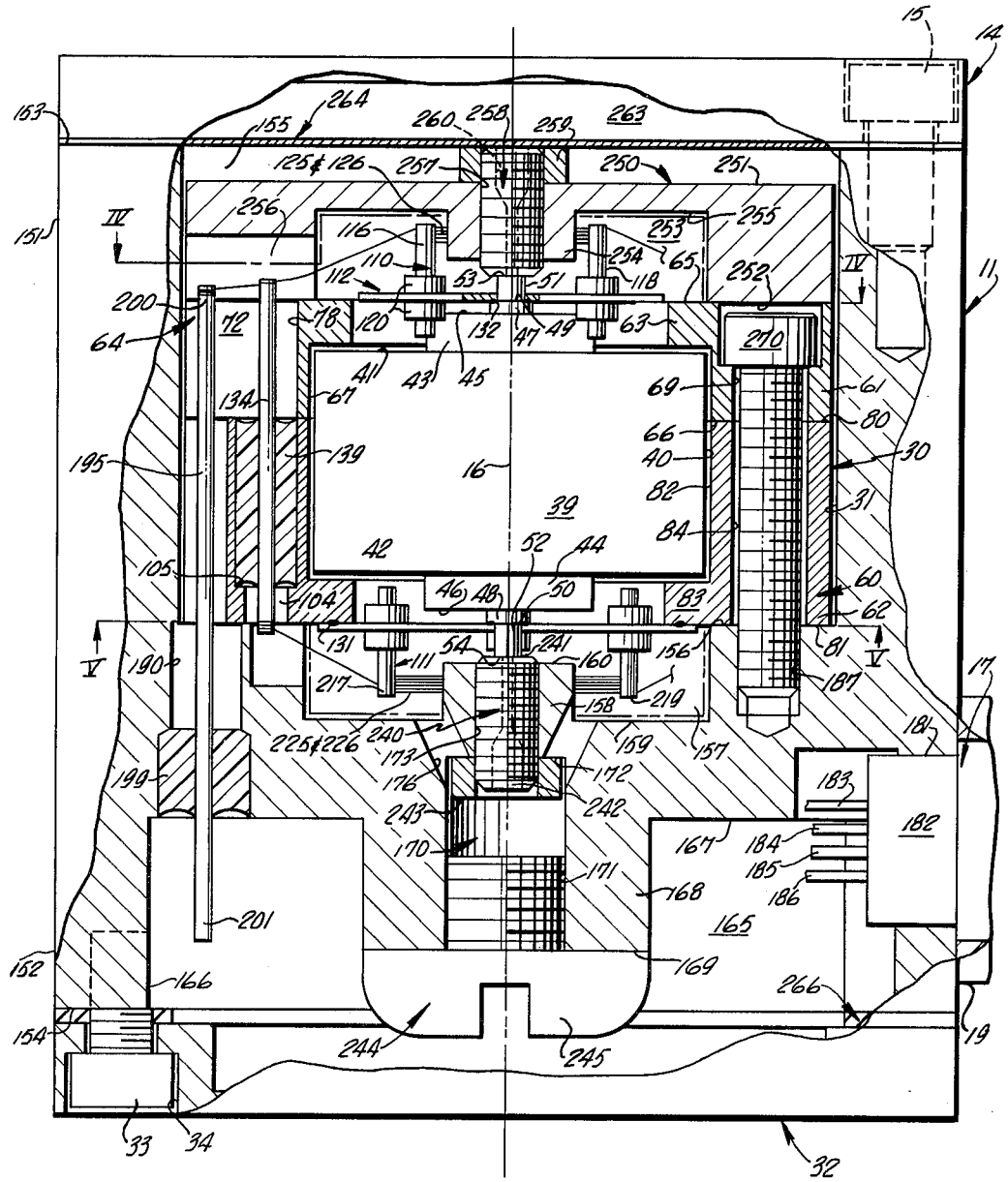
FIGURE 3 is an enlarged cross-sectional view of the transducer taken along line III—III of FIGURE 1.

Referring to FIGURES 1 and 2, the accelerometer 10 of this invention has a cylindrical housing, body or support section 11 formed integrally with an enlarged rectangular mounting flange 12 including mounting holes 13 at the corners thereof. The top of the cylindrical portion 11 is closed by a cover plate 14 secured to the support 11 by hex-socket screws 15 recessed into the cover 14. A sensitive axis 16 of the accelerometer 10 corresponds to the center line of the cylindrical support 11. A four-conductor electrical cable 17 extends from one of the vertical sides 18 of the mounting flange or base 12 through a sealing sleeve 19. The under surface 20 of the base 12 is carefully prepared to be perpendicular to the sensitive axis 16 of the transistor 10.

II. WIRING ASSEMBLY

Referring to FIGURE 3, within the cylindrical support 11 there is a wiring assembly 30 which includes a seismic mass 39, an upper 61 and a lower 62 ring of a mass cage 60, a pair of sensing elements 110 and 111 at opposite ends of the mass 39, and secondary terminals 133–138 for the sensing elements 110 and 111. The support or body 11 further includes a top filler plate 250 and tertiary or support terminals 191–198 for the electrical components in an upper interior cavity 31. Auxiliary fittings for the introduction of the damping fluid in the upper or seismic mass cavity 31 are provided.

A. Seismic mass

As illustrated in FIGURE 3, the seismic mass 39 is rectangular in vertical cross section. However, in horizontal cross section, the mass 39 preferably is circular, but may be square. The mass 39 has a vertical peripheral surface 40, a top surface 41 and a bottom surface 42 preferably perpendicular to the sensitive axis 16 of the accelerometer 10; the mass configuration thus described is by way of example and not as a limitation on the shape of the mass 31. Central circular reduced diameter portions or shafts 43 and 44 extend from the top and bottom surfaces 41 and 42, respectively, concentric to the axis 16 and terminate in surfaces 45 and 46, respectively, perpendicular to the sensitive axis 16. Second circular projections or shafts 47 and 48 on the first shafts 43 and 44, respectively, extend from the surfaces 45 and 46 to terminate in lands or end surfaces 49 and 50, respectively. Third reduced diameter shafts or projections 51 and 52 project from the surfaces 49 and 50, respectively, to terminate in end or over-acceleration stop-abutting surfaces 53 and 54, respectively. Thus, the upper surface 41 of the seismic mass 39 includes, a series of three reduced-diameter steps or shafts 43, 47, and 51 having end-surfaces 45, 49, and 53, respectively, while the mass 39 bottom surface 42 includes a similar series of three reduced-diameter step-portions 44, 48, and 52 having end-surfaces 46, 50 and 54 perpendicular to the sensitive axis 16.

Preferably, the seismic mass 39 is solid, but it may include a series of wells or hollows (not shown) therein for accommodating small weighting pellets to adjust the total mass of the seismic portion 39 to provide fine adjustment of the accelerometer 10 to provide rated output from the accelerometer at the upper limit of the acceleration or G-range for any given accelerometer.

B. Mass enclosure

(1) UPPER RING

Figure 5:
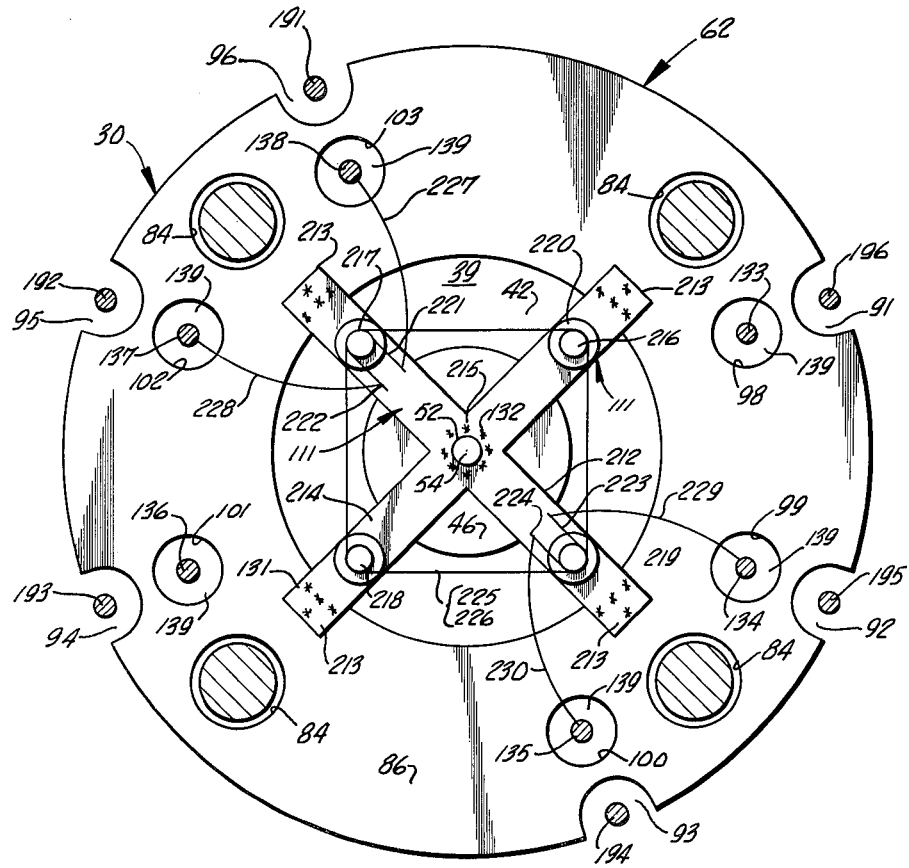
FIGURE 5 is an enlarged bottom plan view of the wiring assembly of the transducer taken along line V—V of FIGURE 3.

A mass cage, enclosure, or housing 60 surrounds the seismic mass 39 and is a component of the wiring assembly 30 of the accelerometer 10 (refer to FIGURES 3, 4, and 5). The cage 60 is comprised essentially of an upper ring 61 and a lower ring 62. The upper ring 61 is a hollow circular cylinder having an inwardly extending flange 63 at its upper end 64. The upper and lower surfaces 65 and 66, respectively, of the upper ring 61 are parallel to one another and are perpendicular to the central axis of the ring which is coincident with the sensitive axis 16 of the accelerometer 10. The internal diameter of the upper ring 61 within the inner peripheral upper flange 63 is greater than the diameter of the first step or reduced diameter shaft 43 at the upper surface 41 of the seismic mass 39. The major internal diameter of the upper ring 61 below flange 63 between inner surfaces 67 is slightly greater than the extreme diameter of the seismic mass 39 between peripheral surfaces 40.

A series of holes are drilled longitudinally of the upper ring 61 (see FIGURE 4); there are four holes 68 for securing the upper ring 61 to the lower ring 62, and four recessed through-bolting holes 69 for securing the wiring assembly 30 to the support 11. A pair of holes 70 are drilled diametrically from one another in the upper ring 61 but do not extend to the bottom surface 66 of the ring 61, and are tapped internally to accommodate the securing screws for the top filler plate 250.

A seriets of six radial recesses 71 through 76 are provided in the periphery of the upper ring 61 and extend from the upper surface 65 to the lower surface 66 (FIG. 4). Recesses 71, 72, and 73 are grouped together and are spaced equidistantly from one another over a ninety degree (90°) arc diametrically opposite from recesses 74, 75, and 76. Each of the recesses 71 through 76 has opposite parallel vertical walls 77 extending to a vertical semicircular end surface 78. These radial recesses 71 through 76 serve as passages or ducts for binding posts 133–138 and 191–198 extending between the upper 110 and lower 111 sensing elements of the accelerometer 10.

(2) LOWER RING

The lower ring 62 of the mass cage 60 resembles a hollow circular cylinder and has an upper surface 80 and a lower or bottom surface 81 which are parallel to one another and perpendicular to the central axis of the cylinder. The lower ring 62 has an inner surface 82 corresponding exactly to the inner diameter 67 of the upper ring 61, and the outer diameters of the upper and lower rings 61 and 62 are correspondingly identical. A lower inwardly extending flange 83 is provided at lower surface 81 of the lower ring 62 and has a diameter between the flange surface corresponding to the diameter across the flanges 63 of the upper ring 61. The distance between the upper and lower surfaces 80 and 81, respectively, of the lower cage ring 62 is greater than the distance between the corresponding surfaces 65 and 66 of the upper ring 61.

A series of holes are drilled axially of the lower ring 62. Four untapped holes 84 spaced at ninety degrees (90°) from one another and serving as extensions of the through-bolting holes 69 are provided and have an internal diameter corresponding to holes 69.

A series of six radial recesses 91 through 96 are provided along the outer periphery of the lower ring 62 and are spaced corresponding to the recesses 71 through 76 of the upper ring 61. These recesses are substantially semicircular in shape with a diameter corresponding to the distance between the parallel sides 77 of the upper ring recesses 71–76. A series of holes 98 through 103 are drilled adjacent the inner end of each of the recesses 91 through 96 (one hole for each recess) and have a diameter less than the distance between the parallel sides 77 of the upper ring recesses 71–76. These holes 98 through 103 are located in the lower ring 62 such that their inner extremities are tangent to the inner semicircular vertical face 78 of the upper ring recesses 71 through 76.

(3) SENSING ELEMENTS

The sensing elements 110 and 111 utilized with this invention are of the unbonded strain-gauge type and are comprised of coils of wire which has its electrical resistance characteristics dependent on the stresse of the wire. However, sensing elements bonded directly to the deformable member may be utilized without departing from the scope of this invention.

Upper 110 and lower 111 sensing elements are provided as components of the wiring assembly 30 of the accelerometer 10. Since the upper and lower sensing elements 110 and 111 are identical in construction and differ only in their orientation with respect to the wiring assembly 30 (compare FIGS. 4 and 5), only the upper sensing element 110 will be described in detail; but since items of the lower sensing element 111 will be mentioned with reference to other components of the accelerometer 10, parts of the lower sensing element 111 which correspond identically to components in the upper sensing element 110 will be considered to have characters one hundred (100) units greater than those of the upper sensing element 110. Thus, part 115 of the upper sensing element 110 corresponds to part 215 of the lower sensing element 111.

A spring means or flexural element 112, preferably comprising a flat substantially planar leaf spring formed in the configuration of a cross or X-star having four right-angled equal-length legs, is provided as one of the main components of the sensing element 110 (see FIGURE 4). Preferably the spring 112 has the ends 113 of the arms 114 in the same plane as the central portion 115 of the spring, but the central portion 115 may be downwardly depressed or indented without departing from the scope of this invention. One of four posts 116 to 119, fabricated from synthetic ruby or any other temperature-stable electrically nonconductive composition, extends through each arm 114 of the spring 112 adjacent the end 113 and is secured at right angles to the spring 112 by a washer 120 on either side of the spring 112. The posts 116 to 119 extend farther above the surface of the spring 112 than below (see FIGURE 3). A pair of pins 121 and 122 are secured to the long end of post 116 and extend inwardly toward the central portion 115 of the spring 112; pin 120 is located near the top of the post 116 while pin 122 is adjacent the top washer 120. A pair of pins 123 and 124 are secured to the opposite pin 118 in a similar fashion.

A coil 125 of strain-sensitive wire, having properties such that its electrical resistance changes as the wire suffers stress, is wound around pins 116 to 120 and is secured between pins 121 and 122. A second coil 126 of strain-gauge wire is wound around posts 116 to 120 and is secured to pins 123 and 124 of post 118. Bifilar coils 125 and 126 are wound independently of one another and are physically isolated from one another on the posts 116 to 120. Leads or electrical conductors 127 through 130 are connected from pins 121 to 124, respectively, for ultimate connection to terminals 133–138 leading to the exterior electrical circuitry of the accelerometer 10. The sensing elements 110 and 111 described above are of the unbonded strain-wire type, but a bonded-type of strain-sensitive resistance strip may be secured directly to the springs 112 and 212 without departing from the scope of this invention.

C. Assembly of the wiring assembly

Before continuing with the detailed description of the components of the accelerometer 10 of this invention, it is considered that an explanation of the assembly procedure of the wiring assembly 30 will provide increased understanding of this invention. After the seismic mass 39, the upper and lower mass cage rings 61 and 62 and the sensing elements 110 and 111 have been fabricated, the assembly of wiring assembly 30 takes place. The first step of this operation is to locate the upper sensing element 110 on the upper enclosure ring 61 in such a manner that the posts 116 to 119 are nearly exactly concentric to the axis 16 of the bore of the upper ring 61 as possible. The sensing element 110 is located such that the ends 113 of the spring arms 114 are in contact with the upper surface 65 of the ring 61 on the flange 63. The flexural element 112 of the upper sensing unit 110 is then secured, as by spot-welding (as indicated by characters 131 of FIG. 4), to the flange 63. The same procedure is followed in attaching the lower sensing element 111 to the bottom surface 81 of the lower ring 62 at the flange 83. However, when the lower sensing element 111 is secured to the lower ring 62, it is preferable that the arms 214 of the lower sensing element 111 lie forty-five degrees (45°) from the location of the arms 114 of the upper sensing element 110. (Compare FIGURES 4 and 5).

The next stage of the completion of the wiring assembly 30 is the insertion of the seismic mass 39 into the lower ring 62 and then placing the upper ring 61 on the lower ring 62 such that surfaces 66 and 80 abut, and surfaces 67 and 82 should be aligned. The seismic mass 39 is then positioned accurately within the cavity of the cage or enclosure 60, preferably so that the mass 39 is positioned within the cage 60 such that the clearance between the outer surface 40 of the mass 39 and the inner surfaces 67 and 82 of the enclosure 60 is uniform. When the mass is so located within the enclosure 60, the reduced diameter shaft portions 51 and 52 at the top and bottom, respectively, of the mass 39 project through apertures 137 and 138 provided in the central portions 115 and 215 of the top and bottom sensing elements 110 and 111, respectively. The sensing elements are then secured to the seismic mass by spot-welding, as indicated by the character 132 in FIGURES 4 and 5. The result of this is that the spring portion 112 of the upper sensing element 110 is secured to the surface 49 of the second shaft or reduced diameter portion 47 at the upper end of the mass 39, and the lower spring element 112 is bound to the surface 50 of the second step or reduced diameter portion 48 at the bottom of mass 39. Accordingly, as is apparent from FIGURE 3, when the mass moves axially relative to the enclosure, the wires of the upper sensing element are stressed in a manner opposite to the stress imposed upon the wires of the lower sensing element.

Terminal posts 133 to 138 were secured in the holes 98–103, respectively, of the lower ring 62 prior to the installation of the sensing element 111. An insulator or potting material 139 secures the terminals 133 to 138 within the holes 98 to 103 so that the terminals 133–138 project through upper ring recesses 71–76. The upper ends of the terminals project above the upper surface 65 of the top ring 61 while the lower ends of the terminals project below the lower surface 81 of the lower ring 62.

The wiring of the strain-gauge coils 125 and 126, 225 and 226 is as follows: Lead 127, connected to pin 121 associated with the strain-gauge coil 125, is connected to the upper end of terminal 133, while the other lead 128, connected to pin 122 and also associated with the strain-gauge coil 125, is connected to the upper end of terminal 134. Lead 129, associated with the strain-gauge coil 126 of the upper sensing unit 110, is connected between pin 123 and terminal 137; while the other lead 130, associated with the coil 126, is connected between pin 124 and the upper end of terminal 136. Coil 225 in the bottom sensing unit 111 is wired between terminals 137 and 138 by connecting the lead 227, associated with pin 221, to terminal 138 and connecting lead or conductor 228 from pin 222 to the lower end of terminal 137. Finally, coil 226 is wired by connecting conductor 229, previously connected to pin 223, to the lower end of terminal 134 and by connecting conductor 230 from pin 224 to the lower end of terminal 135. The result of this is that one end of coils 126 and 225 are connected to terminal 137 and one end of the coils 125 and 226 are connected to terminal 134.

III. SUPPORTING AND AUXILIARY STRUCTURE

A. Support

A support envelope, or base 11, of generally cylindrical outward configuration and having top 151 and bottom 152 portions is provided as a housing for the wiring assembly 30. The support 11 has an upper surface 153 and a lower surface 154. A cavity 155 is drilled or formed concentrically with the axis 16 of the body or support 11, opens upwardly to the top surface 153 and has a bottom surface 156; the diameter of cavity 155 is such as to accommodate the wiring assembly 30. A well 157 is provided in the bottom of the cavity 155 below surface 156. A central projection or stub-shaft 158 rises from the bottom surface 159 of the well 157 and has a diameter such that the shaft 158 lies within the strain-gauge coils 225 and 226 of the bottom sensing element 111. The stub-shaft 158 has an upper surface 160 lying intermediate the bottom surface 159 of the well 157 and the bottom surface 156 of the cavity 155.

A lower cavity or recess 165 has side walls 166 and a top surface or end 167 perpendicular to axis 16. A projection 168 depends from the top 167 of the well 165 into the well 165 and terminates in a bottom surface 169 within the cavity 165.

A hole 170 is drilled from the cavity 165 to the cavity 155 axially of the body 150. An internally tapped first portion 171 of hole 170 extends from the bottom surface 169 of the central projection 168 upwardly to a shoulder 172, and a second internally tapped portion 173 of hole 170 extends from the shoulder 172 to the projection surface 160. A series of ducts or passageways 176 extend from the first portion 171 of hole 170 to the upper cavity 155 emerging adjacent the base of the central projection 158. These ducts 176 are the damping fluid inlet ducts for filling the interior of the accelerometer 10.

A hole or aperture 181 is provided between the outer surface of the cylindrical base 11 and cavity 165 to accommodate a socket 182 for the electrical cable 17 having therein four conductors 183 to 186. The protective sleeve 19 surrounding the cable 17 directly abuts the support 11 adjacent the socket 182 and is constructed in such a way that the cavity 165 of the support 11 may be hermetically sealed from the outside of the support 11.

Four tapped holes 187 are drilled axially of the body 11 at the surface 156 of the upper cavity 155 and are the securing sockets for the through-bolts holding the wiring assembly 30 to the support 11.

A series of six holes 190 are drilled between the top surface 167 of the lower cavity 165 to the bottom surface 156 of the upper cavity 155. The location of the holes 190 corresponds to the spacing of the recesses 71 to 76 and 91 to 96 in the outer sides of the mass enclosure 60. A binding post or conductor 191–196, similar to the binding posts or conductors 133 to 138, is held in each of the holes 190 by a potting or insulating material 199 similar to that in the holes 98–103 securing the conductors 133 to 138. Two additional holes (not shown) are drilled a short way into body 11 from the lower cavity 165 and support terminals 197 and 198 which depend into cavity 165 from their potting insulators. The upper end 200 of each of the terminals 191 to 196 is adjacent the upper ends of the terminals 133 to 138, while the lower ends 201 of the terminals extend into the cavity 165 in the lower portion 152 of the support 11. Terminals 191–198 are provided so that final wiring of the accelerometer and connection to the conductors 183–186 may be made in a location which is accessible after the accelerometer has been once put into use. This is necessary since the interior of the accelerometer 10 is then filled with damping fluid.

An over-acceleration stop or pin 240 having external threads is screwed into the second diameter portion 173 of hole 170 and has its upper end 241 projecting above surface 160 of the projection 158 in well 157. The lower end 242 of pin 240 is secured by a special lock nut 243 against shoulder 172.

A screw 244 having a slotted head 245 abutting the bottom surface 169 of the lower cavity 165 projection 168 is secured in the first or major diameter portion 171 of the hole 170. Preferably the threads in the lower portion of hole 170 are prepared with a sealing compound before the screw 244 is engaged therein.

B. Top filler plate

A top filler plate 250 is provided to enclose the upper sensing element 110 within the cavity 155. The diameter of the filler plate 250 corresponds to the diameter of the wiring assembly 30. A downwardly opening cavity or recess 253 is provided in the top filler plate 250 and has a central concentric projection 254 which depends from the upper surface 255 of the cavity 253. Six (6) radial slots 256 are provided in the under surface 252 of the top filler plate between the limits of the cavity 253 and the outer periphery of the filler plate 250 and correspond to the location of the holes 190 in the support 11. These slots 256 are provided to assure clearance for the upper ends 200 of the binding posts or terminals 133–138 and 191–196.

A hole 257 is drilled axially of the filler plate 250 from the upper surface 251 into the cavity 253 and is internally threaded or tapped. An upper over-acceleration stop or pin 258 having external threads is screwed into the hole 257 and is secured by a lock nut 259 resting against the upper surface 251. An axial hole 260 is drilled through the length of the upper over-acceleration stop pin 258 and has a diameter less than the diameter of the upper or smallest diameter projection 51 of the seismic mass 39.

A pair of holes (not shown) are drilled axially of the top plate 250 near its periphery and correspond to the two tapped holes 74 in the top ring 61 of the wiring assembly 30 to accommodate screws for securing the top filler plate 250 to the wiring assembly 30.

The top cover plate 14 was mentioned briefly at the beginning of this detailed description. The cover plate 14 includes a central downwardly opening recess 263 to provide for expansion of a diaphragm gasket 264 which is placed between the top cover 14 and the cylindrical main support or body 11 of the accelerometer 10 during final assembly.

IV. FINAL ASSEMBLY

After the internal wiring has been completed, the top cover plate 250 is secured to the wiring assembly 30 by means of two screws provided for this purpose after the wiring assembly 30 has been secured to the base support 11 by the through-bolts 270. The over-acceleration stop pin 258 is adjusted relative to the top cover plate 250 and is secured in its final adjusted position by the lock nut 259. The top cover gasket piece 264 is then located in position and the top cover 14 is then secured to the support 150 by the hex-socket screws 15.

The lower over-acceleration stop pin 240 is then screwed into the third or smallest diameter portion 175 of the hole 170 and is locked into position by the lock nut 243 after adjustment relative to the bottom over-acceleration stop surface 54 on the seismic mass 39. The slotted head screw 244 is then secured in the major or lower diameter portion 171 of hole 170 after being prepared with a thread-sealing compound or an O-ring. The accelerometer 10 is then inverted for filling with damping oil or damping fluid. The viscous damping fluid to restrict the natural vibrational characteristics of the seismic mass is introduced through the hole 170 and flows into the cavity 155 through the filling ducts 176.

The final step in the assembly of the accelerometer is to place a lower gasket 266 across the lower end 152 of the support and to secure the bottom cover 32 against the gasket by hex-socket screws 33.

During the final assembly process the over-acceleration stop pins 240 and 258 should be adjusted so that a slight clearance is provided between the smallest diameter step portions 51 and 52 of the seismic mass 39 and their adjacent stop pins. In practice, the accelerometer 10 of this invention is fabricated for various G-ranges. If, say, in an accelerometer rated for 100 G, the transducer were subjected to a 200 G over-acceleration, it is entirely possible that the movement of the mass 39 would be such that the strain-gauge wires 125, 126, 225 and 226 may ultimately break under this load. In order to prevent excursions of the mass of greater magnitude than the transducer can withstand, the mechanical over-acceleration stops 240 and 258 are provided such that the movement of the seismic mass 39 is limited when an over-acceleration impact or input is experienced by the transducer 10.

As the transducer 10 is subjected to an increase in temperature the damping fluid expands, but the top gasket diaphragm 264 is free to expand into the cop cover recess 263.

This invention provides a highly compact and sensitive transducer by virtue of the double function of the springs 112 and 212. These springs serve as the pick-ups of mass motion for the generation of stress in the strain-wire coils 125, 126, 225 and 226 through movement of the posts 116–119 and 216–219, and they also serve as the suspension elements of the seismic mass 39.

In the foregoing description of this invention, because of the references to upper and lower, top and bottom aspects of the components, it has been implied that the accelerometer 10 is vertically oriented. It is stressed that this has been merely by way of explanation and description only in conjunction with the figures included with this specification and is not to be considered as a restriction on the scope of this invention. In reality, the transducer 10 of this invention may be aligned so that the sensitive axis 16 of the transducer is horizontal, or may even be obliquely angled to fixed spatially oriented reference coordinates. In one form of this invention, three transducers of the type described are placed on a mounting frame so that the sensitive axes 16 of the transducers are mutually perpendicular.

What is claimed is:

1. An accelerometer comprising a seismic mass having spaced apart ends disposed along a mass axis of symmetry, a cylindrical enclosure for the mass, the enclosure having a longitudinal axis concentric with the mass axis of symmetry and having a pair of spaced apart open ends, a pair of substantially flat spring members, each spring member having a central portion and a plurality of spring arms connected integrally thereto and extending radially therefrom to ends remote from the central portion, means for securing the ends of the spring arms of one spring member to one end of the enclosure with the central portion of said one spring member disposed transversely of the enclosure axis, means for securing the ends of the spring arms of the other spring member to the other end of the enclosure with the central portion of said other spring member disposed transversely of the enclosure axis, means for connecting the mass at the opposite ends thereof directly to the central portions of the spaced apart spring members to support the mass between the spring members for axial movement of the mass along its axis of symmetry relative to the enclosure, movement of the mass relative to the enclosure producing axial bending of the arms of the spring members responsive to the amount of movement of the mass, and an electrical strain gauge device mounted on each spring member to provide an electrical signal responsive to bending of the arms of said each spring member, the strain gauge device being mounted solely to the respective spring members.

2. An accelerometer according to claim 1, wherein each strain gauge device includes an electrically nonconductive post mounted to each arm of each spring member and extending away from the mass in substantial alignment with the enclosure axis, each post having an end spaced apart from the spring arm to which it is mounted, and at least one coil of strain-sensitive wire supported by the ends of the posts of said each sensing means.

3. A transducer comprising a seismic mass, a cylindrical enclosure for the mass, flat spring means fixedly mounted to the enclosure and disposed transversely of an axis through the mass and connected to the mass along the axis for resiliently supporting the mass for reciprocal movement of the mass along the axis relative to the enclosure, the spring means bending axially in response to movement of the mass, and electrical sensing means comprising at least one electrical strain gauge device secured entirely to the spring means and responsive to bending of the spring means to provide an output signal.

4. A transducer comprising a seismic mass, a cylindrical enclosure for the mass, flat spring means fixedly mounted to the enclosure and disposed transversely of an axis through the mass and connected to the mass along the axis for resiliently supporting the mass for reciprocal movement of the mass along the axis relative to the enclosure, and two sets of electrical strain gauge sensing means secured in their entirety to opposite sides of the spring means so that one set of strain-gauge means is stressed in a manner opposite to the manner in which the other set of strain-gauge means is stressed upon movement of the mass.

5. A transducer according to claim 4 wherein each set of strain-gauge sensing means comprises a plurality of posts mounted to the spring means between the enclosure and the axis, and a loop of strain-sensitive electrical-resistance wire supported on the posts, the posts for one set of sensing means extending in a direction opposite to the direction in which the posts of the other set of sensing means extend with respect to the mass.

References Cited by the Examiner

UNITED STATES PATENTS

| | | | |
|---|---|---|---|
| 2,311,079 | 2/1943 | Parr | 340—17 |
| 2,453,548 | 11/1948 | Statham | 338—2 |
| 2,533,249 | 12/1950 | Henson | 340—17 |
| 2,657,374 | 10/1953 | Bardeen | 340—17 |
| 2,748,370 | 5/1956 | Baltosser | 340—17 |
| 2,751,573 | 6/1956 | Millington | 340—17 |
| 2,754,435 | 7/1956 | Ongaro | 340—17 |
| 2,994,052 | 7/1961 | Statham | 338—5 |

OTHER REFERENCES

"Strain Gages, Instruments and Accessories," Baldwin-Lima-Hamilton, Electronics and Instrumentation Division, Waltham 54, Mass., January 1, 1960.

BENJAMIN A. BORCHELT, *Primary Examiner.*

NEIL C. READ, CHESTER L. JUSTUS, *Examiners.*